United States Patent
Harrison et al.

(10) Patent No.: US 7,088,505 B2
(45) Date of Patent: Aug. 8, 2006

(54) MICROSCOPE AND FOCUSING DEVICE FOR A MICROSCOPE

(75) Inventors: Paul M. Harrison, Alden, NY (US); Russell Bonaventura, Williamsville, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 63 days.

(21) Appl. No.: 10/811,336

(22) Filed: Mar. 26, 2004

(65) Prior Publication Data

US 2005/0213203 A1 Sep. 29, 2005

(51) Int. Cl.
*G02B 21/06* (2006.01)
*G02B 21/00* (2006.01)
*G02B 23/00* (2006.01)
*G02B 7/02* (2006.01)

(52) U.S. Cl. .................. 359/392; 359/368; 359/383
(58) Field of Classification Search .............. 359/383, 359/391–395, 368
See application file for complete search history.

(56) References Cited

U.S. PATENT DOCUMENTS

| 4,482,221 A | * | 11/1984 | Clark | 359/392 |
| 4,512,206 A | * | 4/1985 | Clark et al. | 74/10.54 |
| 4,573,771 A | * | 3/1986 | Hill | 359/383 |
| 4,653,878 A | * | 3/1987 | Nakasato et al. | 359/381 |
| 5,121,655 A | * | 6/1992 | Toshimitsu | 74/665 B |
| 5,213,293 A | * | 5/1993 | Muentener et al. | 248/123.11 |
| 2005/0057799 A1 | | 3/2005 | Gilbert et al. | 359/383 |

FOREIGN PATENT DOCUMENTS

DE    103 40 721 B3    3/2005

OTHER PUBLICATIONS

English Abstract of Reference DE 103 40 721 B3.

* cited by examiner

*Primary Examiner*—Thong Q. Nguyen
(74) *Attorney, Agent, or Firm*—Simpson & Simpson, PLLC

(57) ABSTRACT

The present invention discloses a microscope and a focusing device for a microscope. The focusing device has at least one operating element attached to a first axle of the focusing device for effecting movement of a microscope stage along the optical axis of the microscope. An adjustable stop mechanism is provided which cooperates with the focusing device to limit the movement of the microscope stage in the direction of the optical axis. The adjustable stop mechanism comprises a rod, a spring for biasing the rod and a screw for adjusting and fixing a position of the rod.

22 Claims, 9 Drawing Sheets

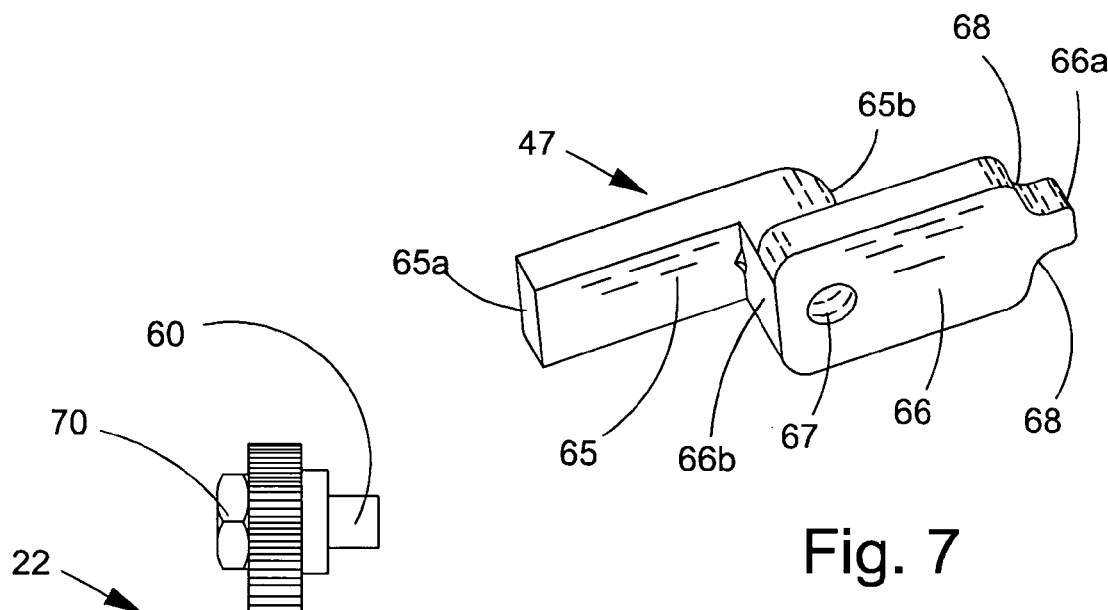
Fig. 7
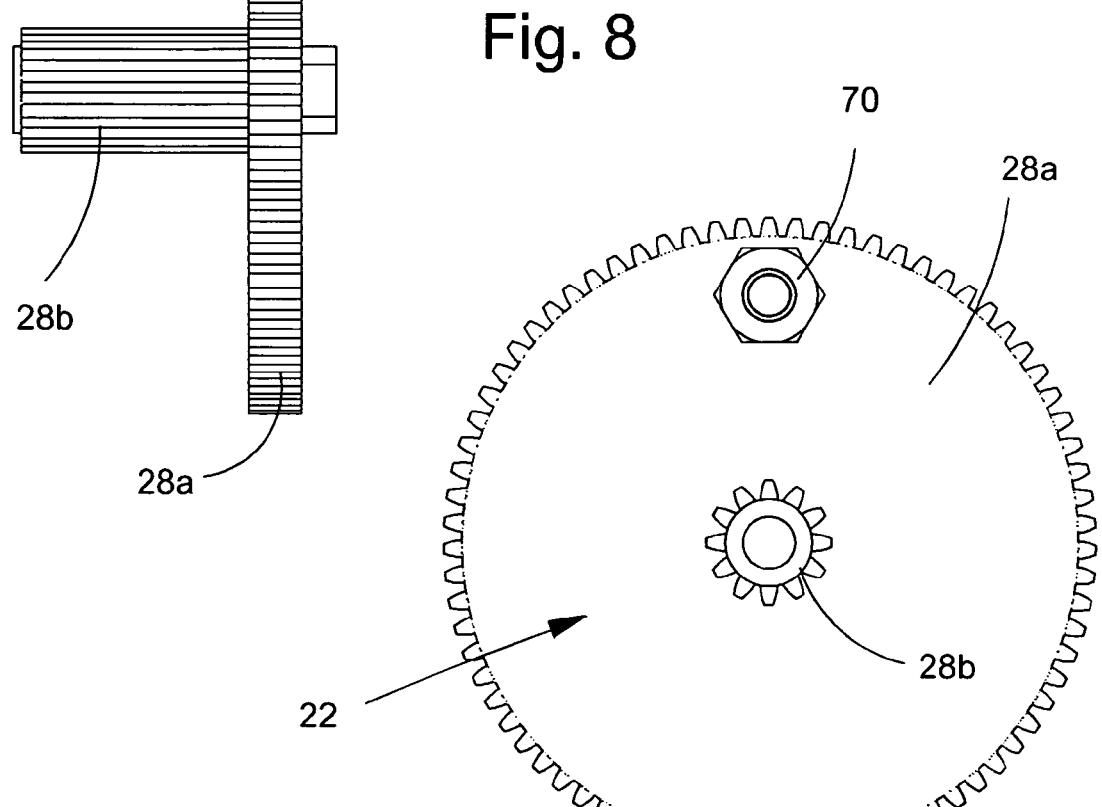
Fig. 8
Fig. 9

MICROSCOPE AND FOCUSING DEVICE FOR A MICROSCOPE

FIELD OF THE INVENTION

The invention relates to a microscope. In particular the invention relates to a microscope which has a height adjustable focusing device. The invention furthermore relates to a focusing device for a microscope.

BACKGROUND OF THE INVENTION

Microscopes are well known instruments. The focusing with upright microscopes is done by a change of the relative position of the sample on the microscope stage and the objective in the working position. This can be done by moving the turret or by moving the microscope stage on which the sample to be investigated is positioned. According to one embodiment the sample is positioned in a special slide or sample holder and the microscope stage is moved in the direction of the optical axis of the objective which is in the operating position. A focusing by moving the microscope stage is mainly done in upright microscopes.

The focusing is initiated by the user when using at least one of the operating elements provided at the microscope stand, which causes the microscope stage to move in the direction of the optical axis of the objective. In general the operating elements comprise an operating element for the fine focus and an operating element for the coarse focus. The operating elements are in the form of a rotating knob. Both rotating knobs are arranged on a common rotating axis. The rotational movement of either rotating knob is transferred into a linear movement of the microscope stage.

The operating element or the operating elements are provided at a fixed position at a side wall of the microscope stand. The operating elements are arranged at a certain distance from the support on which the microscope is placed. The arrangement of the operating elements is optimized for the average user. For users with large hands the arrangement of the operating elements is too low and for users with small hands the arrangement of the operating elements is too high. Consequently, the use of the microscope by a non-average user is not ergonomic, and is also fatiguing or may cause muscle tension.

Unpublished German patent application DE 103 40 721.9 shows a focusing device which allows a height adjustment of the focusing device. As a consequence of the height adjustment the position of the operating elements at the side wall of the microscope is changed. The position of the operating elements is adjustable to the user's ergonomic requirements and/or preferences. It has not been previously appreciated that by changing the position of the operating elements the level of the microscope stage changes as well. The range of travel of the microscope stage is shifted and this may cause damage of the slide or the microscope objective.

SUMMARY OF THE INVENTION

It is a general object of the present invention to provide a microscope which is ergonomic to use for all users and avoids any potential damage to the microscope objective and/or the microscope slide.

The object is achieved by microscope comprising:
 a microscope stand;
 a focusing device arranged inside the microscope stand and at least one operating element is provided at a first and a second end of the focusing device each of which protrudes through a side wall of the microscope stand;
 a microscope stage moveably mounted to the microscope stand;
 at least one objective which defines in its working position an optical axis, and the at least one operating element of the focusing device effects a relative movement between the microscope stage and the objective;
 an elongated slot formed at each side wall of the microscope stand which allows a change of the position of the at least one operating element in a horizontal and vertical direction; and
 an adjustable stop mechanism to limit the relative movement of the microscope stage in the direction of the optical axis.

It is a further object of the invention to provide a focusing device for a microscope which is ergonomic to use for all users and avoids any potential damage to the microscope objective and/or the microscope slide.

The object is achieved by a focusing device for a microscope comprising:
 at least one operating element attached to a first axle of the focusing device for effecting movement of a microscope stage along an optical axis of the microscope; and
 an adjustable stop mechanism cooperating with the focusing device to limit the movement of the microscope stage in the direction of the optical axis.

It is advantageous for the microscope to be provided with a pivot axis about which the focusing device and consequently the at least one operating element is pivotable. This allows the position of the operating element to be adjusted with respect to a side wall of the microscope stand. The focusing device has a first axle defining the first and the second end on both of which at least one operating element is mounted. A second axle is provided, which is parallel to the first axle and around the second axle the focusing device can be pivoted.

The adjustable stop mechanism comprises a rod, a spring for biasing the rod and a screw for adjusting and fixing a position of the rod. The adjustable stop limits the movement of the stage in the direction of the optical axis of the objective. A rocker is provided on the second axle which is operated by a pin which is mounted at the periphery of the first gear wheel of the gear wheel arrangement. The rocker is a one-piece element which comprises a first arm and a second arm and the second axle is common for both arms. The movement of the microscope stage in the direction of the optical axis is limited in case the first arm of the rocker engages with a surface of the rod. Any additional attempt to move the microscope stage further by rotating the operating elements is prevented by a slip clutch. Consequently, any excess force on the operating elements is not transferred to the rocker or the surface of the rod. This additionally avoids damage to the rocker.

The focusing device has the advantage of a gear wheel formed on the first axle of the focusing device and a gear wheel arrangement provided on a second axle. The gear wheel arrangement comprises a first gear wheel with a larger diameter than a second gear wheel, the rotation of the gear wheel is transferred to the first gear wheel of the gear wheel arrangement and the second gear wheel of the gear wheel arrangement transfers its rotational movement to a gear rack which moves the microscope stage in the direction of the optical axis. The adjustable stop mechanism is arranged inside a microscope stand, a dividing wall element is formed inside the microscope stand and the dividing wall element provides a guide for the screw, the spring and the rod of the adjustable stop mechanism.

The rocker has a first and a second arm and the second arm cooperates with the pin and the first arm cooperates with the rod of the adjustable stop mechanism. The second arm of the rocker defines a free end which has an S-shaped contour on opposing sides which cooperates with the pin mounted at the periphery of the first gear wheel of the gear wheel arrangement.

BRIEF DESCRIPTION OF THE DRAWINGS

There are various ways of advantageously embodying and developing the teaching of the present invention. Reference is made to the drawings. In the drawings:

FIG. 7 shows a perspective view of the rocker which cooperates with the adjustable stop mechanism;

FIG. 8 shows a side view of the gear wheel arrangement; and

FIG. 9 shows a plain view of the gear wheel arrangement.

DETAILED DESCRIPTION OF THE INVENTION

Figure 1:
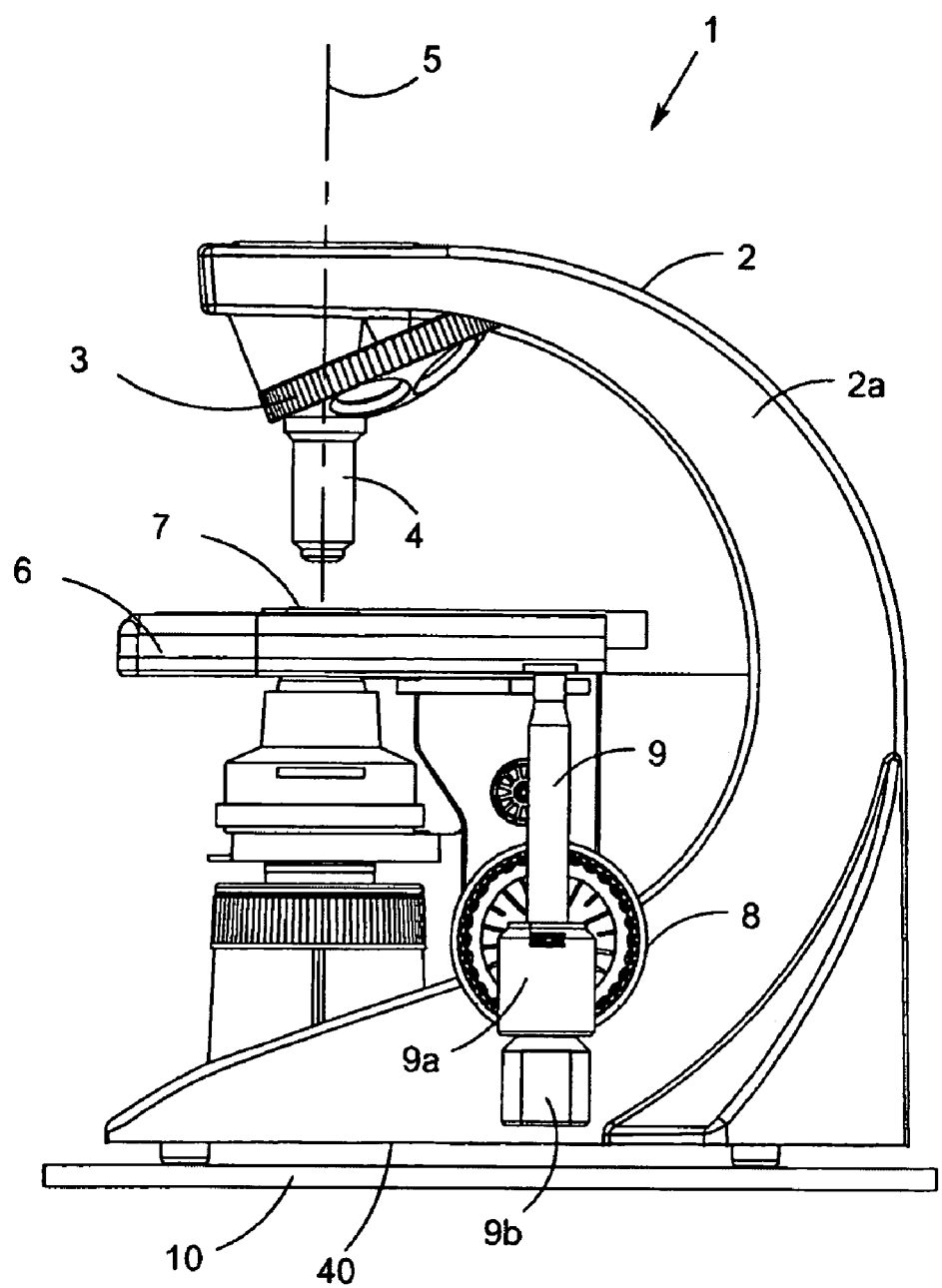
FIG. 1 shows a side view of a microscope in which the invention is embodied.

It should be appreciated at the outset that while the present invention relates to an "Microscope and Focusing Device for a Microscope", the Assignees of the present Application for Patent have developed certain other improvements to microscopes described in United States Patent Application entitled "Ergonomically Arranged Object Adjustment Controls", U.S. patent application Ser. No. 10/811,344 which application is filed concurrently herewith by the Assignees of the present Application for Patent, which Application is incorporated herewith by reference in their entireties.

In the FIGS. 1 to 9 similar elements are marked with the same reference numeral.

FIG. 1 shows a side view of microscope 1, which embodies the teaching of the present invention. Microscope 1 has a microscope stand 2. Microscope 1 is placed on support 10. Additionally, turret 3 is provided at microscope stand 2, wherein the turret carries at least one objective 4. Objective 4 is moved by turret 3 into a working position. Objective 4 defines optical axis 5, which is perpendicular to microscope stage 6, when objective 4 is in the working position. On microscope stage 6 sample 7 to be investigated can be placed. Microscope 1 includes focusing device 20 (see FIG. 3), which is used to bring sample 7 into focus. Focusing device 20 is mounted inside of microscope stand 2 (see FIG. 6). With this focusing device 20 microscope stage 6 can be moved relative to microscope stand 2 in the direction of optical axis 5 of objective 4. Focusing device 20 carries two operating elements 8 (the side view of FIG. 1 shows only one operating element). Each operating element 8 is attached to one of two side walls 2a and 2b of microscope stand 2. With these operating elements 8 the user can effect a positioning of microscope stage 6 in the direction of the optical axis. The positioning of microscope stage 6 results in focusing of sample 7 placed on microscope stage 6. In front of operating element 8 positioning element 9 is provided. Positioning element 9 is connected to microscope stage 6 and enables a positioning of microscope stage 6 perpendicularly to optical axis 5, which in turn enables a positioning of object 7 in the imaging field of objective 4. Positioning element 9 has X-element 9a, which enables positioning of microscope stage 6 in the X-direction. Additionally, positioning element 9 has a Y-element 9b, which enables positioning of microscope stage 6 in the Y-direction.

Figure 2:
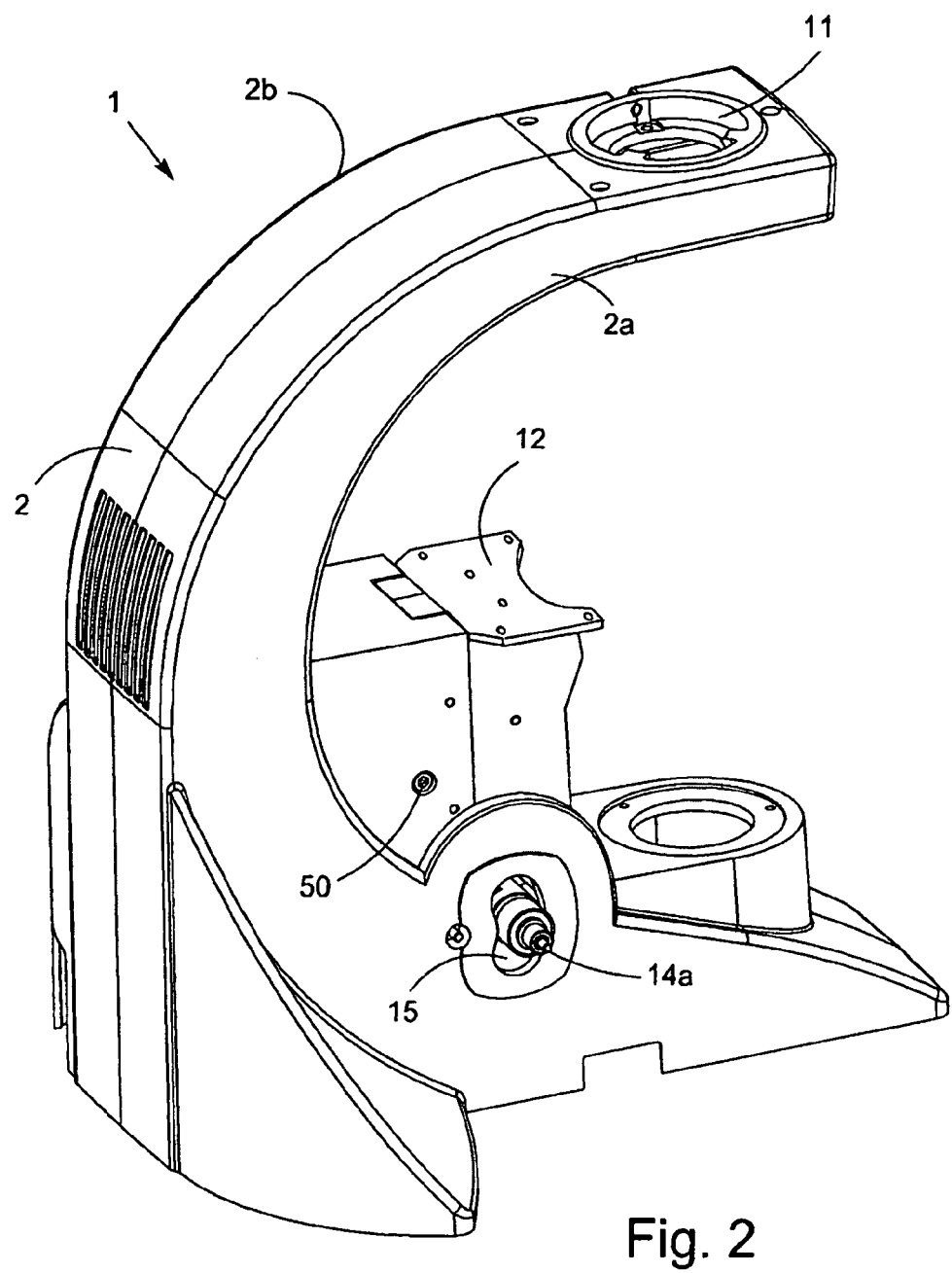
FIG. 2 shows a perspective view of the microscope, wherein several elements are not shown in order to better show the elements of the microscope which utilize the invention.

FIG. 2 provides a perspective view of microscope 1, wherein several elements are not shown in order to obtain a better view of microscope stand 2. Microscope stand 2 has a flange 11 for mounting a tube (not shown). In addition, microscope stand 2 includes mounting element 12 for microscope stage 6 (see FIG. 1). Mounting element 12 is moved by focusing device 20 parallel to optical axis 5 of objective 4 which is placed in the operating position. Inside microscope stand 2 focusing device 20 is mounted, wherein focusing device 20 has first end 14a and second end 14b (see FIG. 3). First and second ends 14a and 14b extend through opening 15, which is formed in first and second side walls 2a and 2b of microscope stand 2. As already mentioned in the description of FIG. 1 operating elements 8 are mounted at first end 14a and at second end 14b. In the embodiment as shown in FIG. 2 opening 15 has the shape of a curved oblong hole, which is formed in opposing side walls 2a and 2b of the microscope stand 2. It should be obvious to a person having ordinary skill in the art that opening 15 may as well be in the shape of a straight hole.

At least one operating element 8 is mounted to focusing device 20 and is operable positioned at side wall 2a or 2b of microscope stand 2. A rotation of operating element 8 causes an upward or a downward movement of microscope stage 6. Focusing device 20 which is positioned inside microscope stand 2 can be pivoted, which causes a movement of operating element 8 at side wall 2a of microscope stand 2 away or towards base 40 on microscope stand 2. According to the height adjustment of operating element 8 microscope stage 6 moves as well. Consequently, it becomes necessary that the travel of microscope stage 6 caused by the use of operating elements 8 is limited in order to avoid damage to a sample placed on microscope stage 6 or the objectives.

Figure 3:
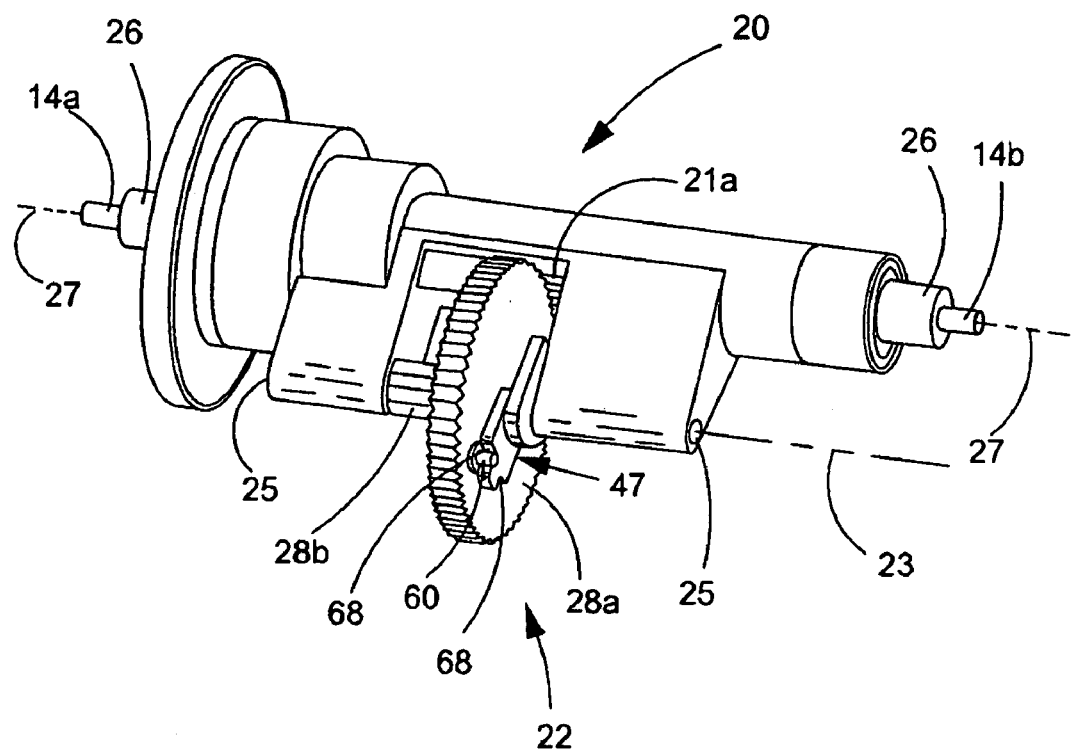
FIG. 3 shows an embodiment of a 3-dimensional view of the focusing device.

FIG. 3 shows a 3-dimensional view of focusing device 20 which is mounted inside of microscope stand 2. Focusing device 20 defines pivot axis 23, around which focusing device 20 can be pivoted. Focusing device 20 comprises two elongated bore holes 25 through which a pin of an axis (not shown in FIG. 3) is guided, with which focusing device 20 is mounted pivotable inside microscope stand 2. Accordingly, pivot axis 23 of focusing device 20 runs in the center of two bore holes 25 which is shown in FIG. 3 with a dashed line. These bore holes 25 hold a second axle 21 (shown in FIG. 4A). Focusing device 20 has an additional first axle 26 which is arranged coaxial to pivot axis 23. First axle 26 rotates around axis 27 and first axle 26 defines first and second ends 14a and 14b, to each of which operating element 8 of focusing device 20 is mounted. The rotating movement between first axle 26, focusing device 20 and second axle 21 is transmitted without any slip. Accordingly, gear wheel arrangement 22 is fixed on second axle 21. A plurality of gear teeth are formed at an area in the middle of first axle 26 and constitute first gear wheel 21a. Gear wheel arrangement 22 comprises first gear wheel 28a with a large diameter and second gear wheel 28b with a small diameter. First gear wheel 28a has a larger diameter than second gear wheel 28b. Gear wheel arrangement 22 is mounted on second axle 21 of focusing device 20. Second gear wheel 28b transfers its rotational movement to gear rack 42 (see FIG. 4a) which moves microscope stage 6 in the direction of optical axis 5. The rotating movement of second axle 21 is transferred to gear rack 42 (see FIG. 4a), which moves microscope stage 6 in the direction of optical axis 5 of objective 4 in the working position. Therefore, gear wheel arrangement 22 is mounted permanently on second axle 21. Second gear wheel 28b of gear wheel arrangement 22 is in engagement with gear rack 42.

Figure 4A:
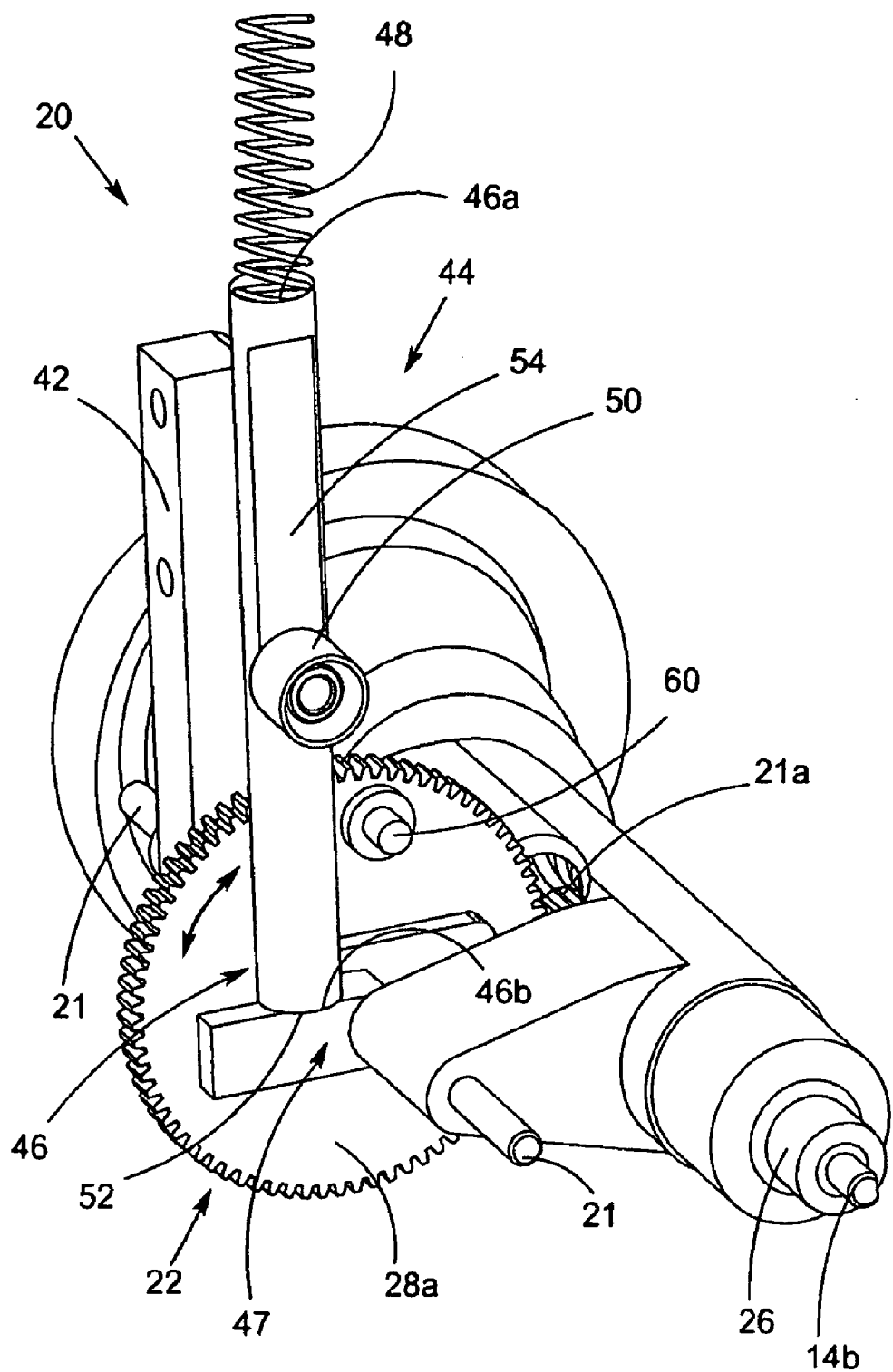
FIG. 4A shows a perspective view of the focusing device in cooperation with the gear rack for moving the microscope stage and the adjustable stop mechanism.

FIG. 4a shows a perspective view of focusing device 20 in cooperation with gear rack 42 for moving microscope stage 6 and adjustable stop mechanism 44. Operating element 8, which has a coarse focus and a fine focus (not shown), and microscope stand 2 are, due to simplicity, not shown here. First axle 26 extends across the inside 2c of microscope stand 2. Second axle 21 carries gear wheel arrangement 22 and rocker 47 which cooperates in certain positions with adjustable stop mechanism 44. Adjustable stop mechanism 44 comprises rod 46, spring 48 for biasing rod 46 and screw 50 for fixing a position of rod 46. As shown in FIG. 2 screw 50 is accessible from side wall 2a or 2b of microscope stand 2. Rod 46 has first end 46a and second end 46b. First end 46a carries spring 48 and second end 46b includes surface 52 against which one part of rocker 47 abuts and consequently limits any further rotation of operating elements 8. This means that a movement of microscope stage 6 in the direction to objective 4 is limited and this avoids any damage of the microscope slide or objective 4. Rod 46 is flattened at first end 46a and therefore shows flattened area 54 which enables a better and secure fixation by screw 50.

Figure 4B:
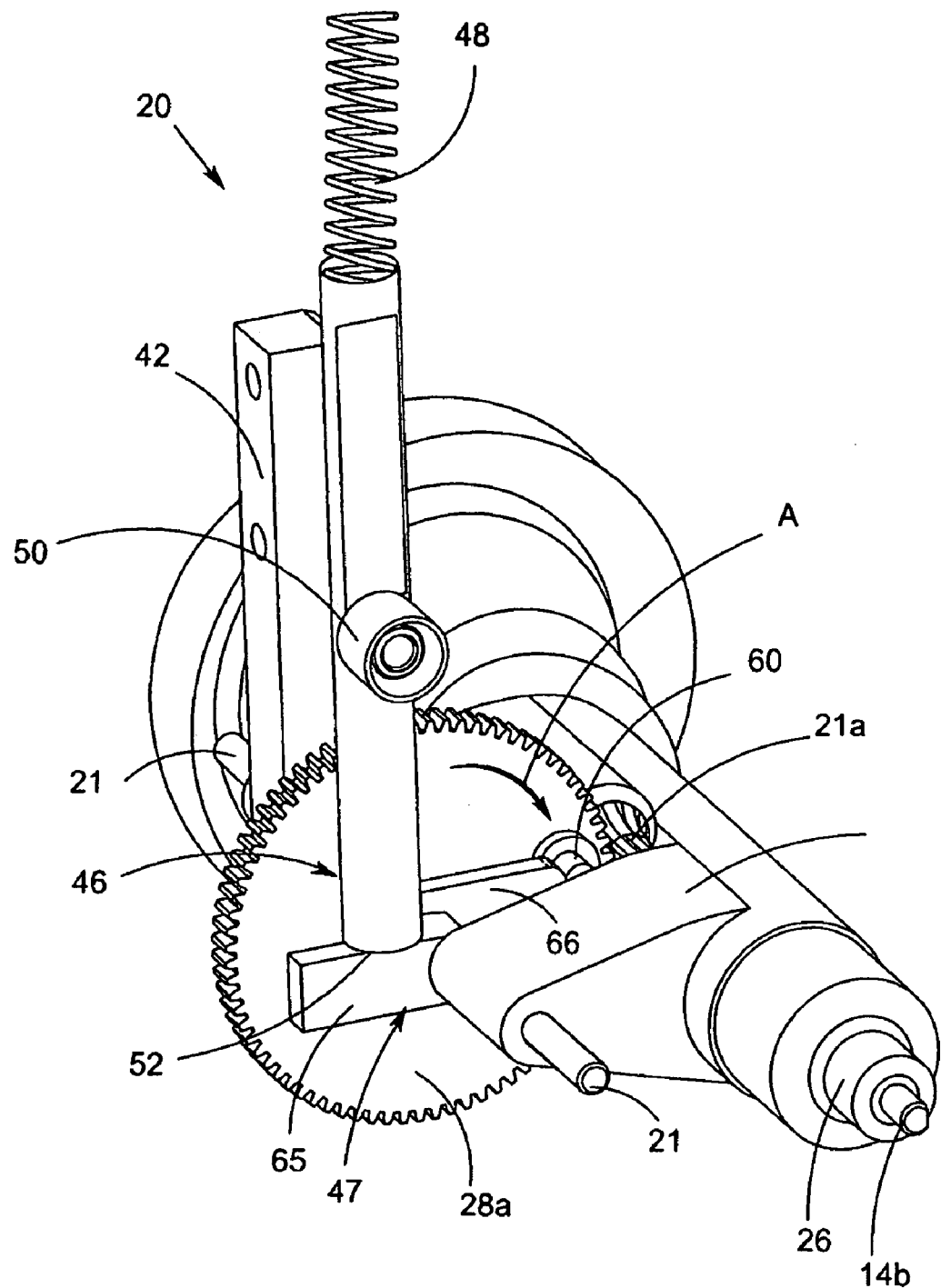
FIG. 4B shows another perspective view of the focusing device in cooperation with the gear rack for moving the microscope stage and the adjustable stop mechanism.

FIG. 4b shows a perspective view of focusing device 20 wherein pin 60 at first gear wheel 28a is in engagement with second arm 66. Pin 60 at the periphery of first gear wheel 28a of gear wheel arrangement 22 is in engagement with S-shaped contour 68, which is formed at free end 66a of second arm 66 of rocker 47. As a result of the engagement first arm 65 of rocker 47 is in engagement with surface 52 of the rod 46. Surface 52 limits the relative movement of stage 6 in the direction of optical axis 5 and adjustment screw 50 at microscope stand 2 sets the level of the adjustment stop, which is defined by surface 52 of rod 46. Adjustable stop mechanism 44 comprises rod 46, spring 48 for biasing rod 46 and screw 50 for fixing the position and the level of rod 46. The rotation direction of gear wheel arrangement 22 is marked with arrow A. The situation as shown in FIG. 4b does not allow any further rotation in the direction of arrow A.

Figure 4C:
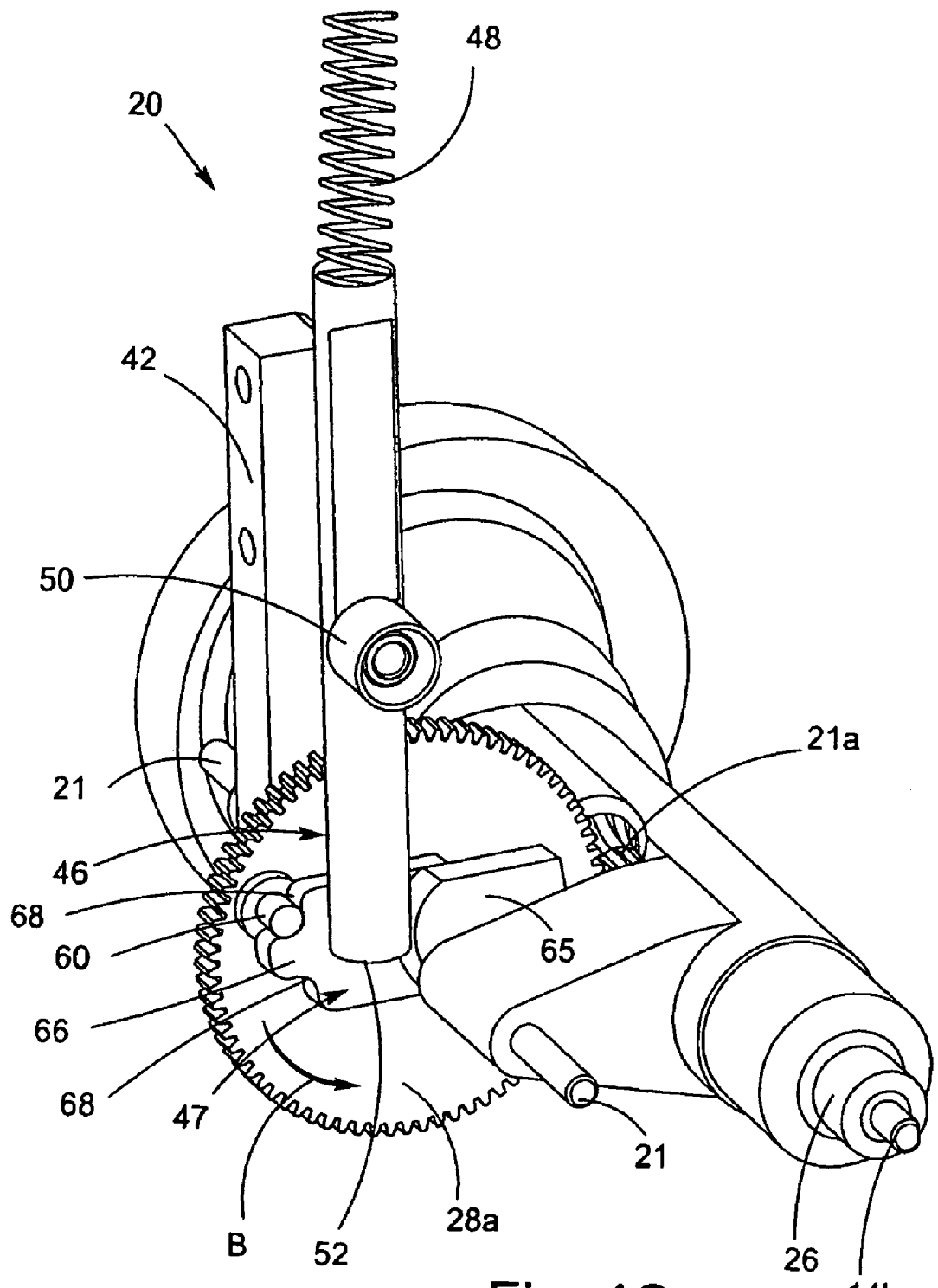
FIG. 4C shows a further perspective view of the focusing device in cooperation with the gear rack for moving the microscope stage and the adjustable stop mechanism.

FIG. 4c shows a perspective view of focusing device 20 wherein first arm 65 of rocker 47 is not in engagement with surface 52 of rod 46. Pin 60 at the periphery of first gear wheel 28a of gear wheel arrangement 22 is in engagement with the other S-shaped contour 68, which is formed at free end 66a of second 66 arm of rocker 47. As a result of the engagement first arm 65 of rocker 47 is disengaged from surface 52 of rod 46. Any further rotation of first gear wheel 28a of gear wheel arrangement 22 is limited by the engagement of first arm 65 of rocker 47 with the side of rod 46. In both cases, as shown in FIGS. 4b and 4c, any further rotation of operating element 8 to be tried by the user is prevented by a slip clutch, being part of operating elements 8.

Figure 5:
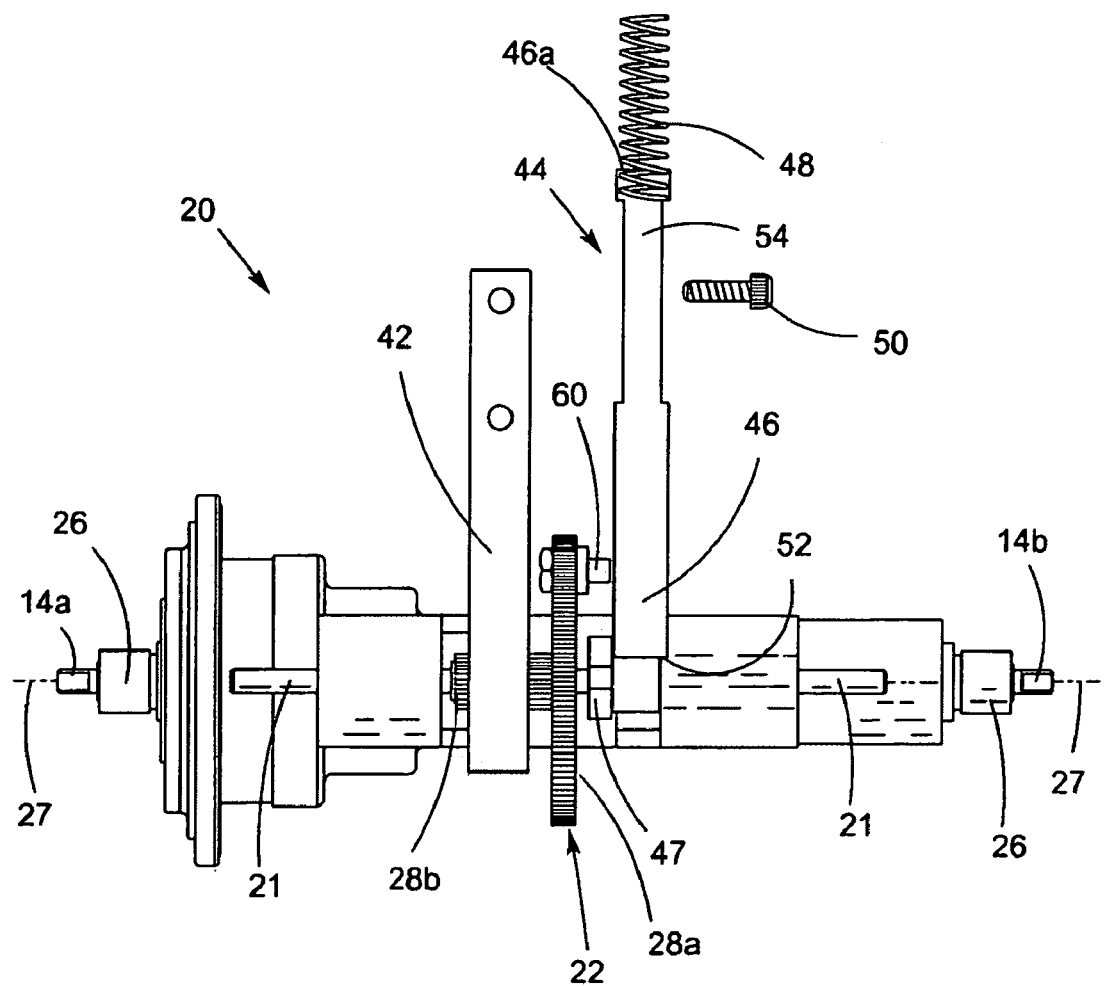
FIG. 5 shows a front view of the focusing device in cooperation with the gear rack for moving the microscope stage and the adjustable stop mechanism.

FIG. 5 shows a front view of focusing device 20 in cooperation with gear rack 42 for moving the microscope stage and adjustable stop mechanism 44. First axle 26 defines first and second end 14a and 14b, to each of which operating element 8 of focusing device 20 is mounted. First axle 26 is arranged parallel to second axle 21. Second axle 21 carries gear wheel arrangement 22, which comprises first gear wheel 28a and second gear wheel 28b. First gear wheel 28a includes pin 60 mounted close to its periphery. Pin 60 cooperates with rocker 47, which is arranged as well pivotable on second axle 21. As already mentioned in the description for FIG. 4a rocker 47 abuts against surface 52 of rod 46. This is caused by a certain position of first gear wheel 28a of gear wheel arrangement 22.

Figure 6:
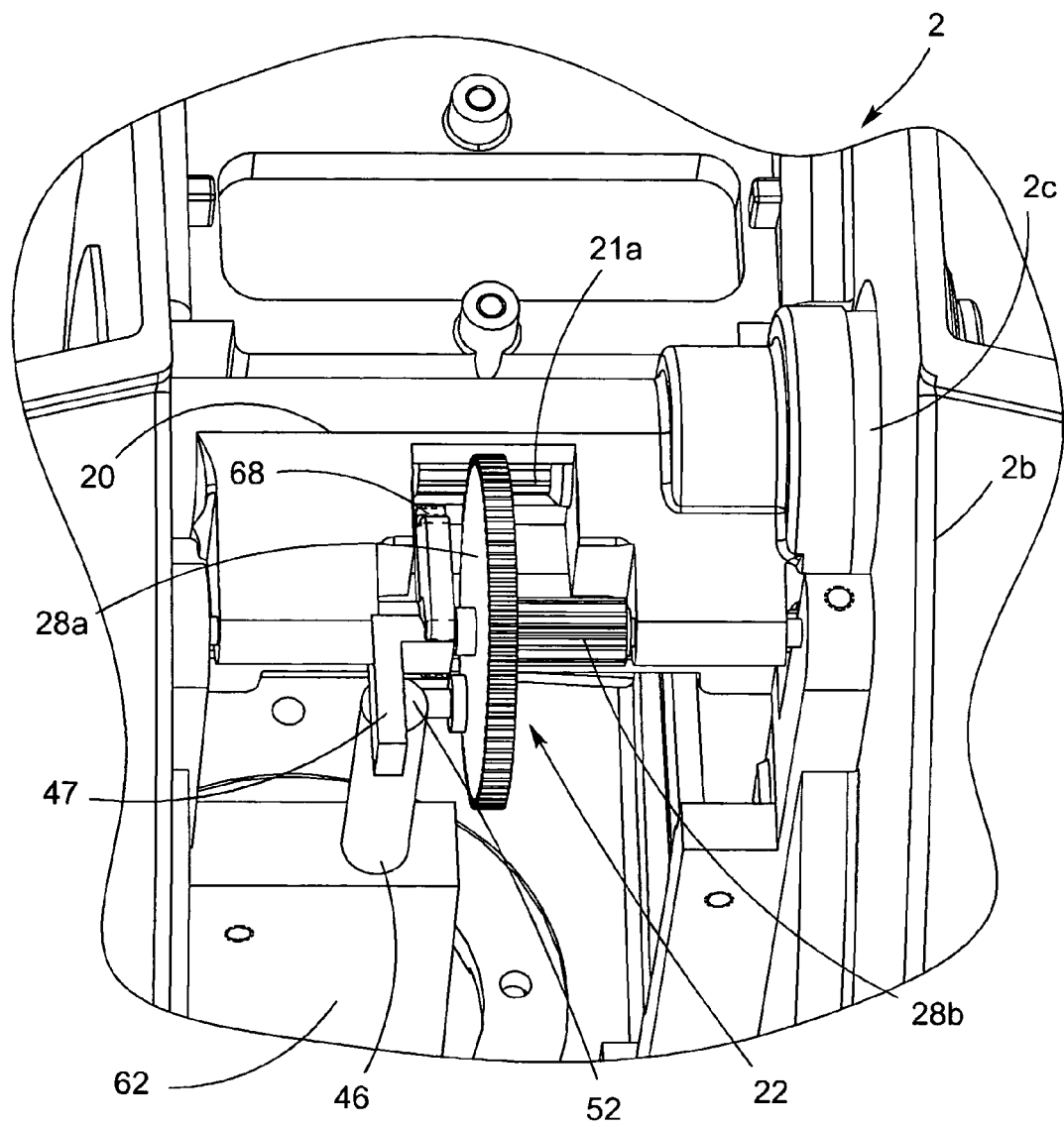
FIG. 6 shows the arrangement of the focusing device inside the microscope stand.

FIG. 6 shows the arrangement of the focusing device 20 on the interior 2c of the microscope stand 2. The focusing device 20 extends between the two opposing side walls 2a and 2b of the microscope stand 2. The interior 2c of the microscope stand 2 has a dividing wall element 62 in which the rod 46 and the spring 48 are guided. The dividing wall element 62 provides as well a guide for the screw 50 (see FIG. 6) which fixes the position of the rod 46 and consequently the fixing of a position of the rod 46, which in turn fixes the surface 52 against which one part of the rocker 47 abuts.

FIG. 7 shows a perspective view of rocker 47 which cooperates with adjustable stop mechanism 44. Rocker 47 has first arm 65 and second arm 66 First arm 65 has free end 65a. Second arm 66 has free end 66a. End portion 65b of first arm 65 opposite to free end 65a and end portion 66b of second arm 66 opposite to free end 66a are connected to each other to form Z-shaped rocker 47. Bore 67 runs through both end portions 65b and 66b. Second axle 21 is guided through bore 67. First arm 65 is a massive block with a rectangular cross section. Free end 66a of second arm 66 has on opposing sides S-shaped contour 68. These S-shaped contours 68 cooperate with pin 60 mounted close to the periphery of first gear wheel 28a of gear wheel arrangement 22. Once pin 60 is in contact with one of S-shaped contours 68 whole rocker 47 is rotated if one of operating elements 8 of the focusing device is rotated. Rotation of rocker 47 is blocked when first arm 65 of the rocker is in contact with surface 52 of rod 46. A slip clutch (not shown) prevents further rotation of the operating elements attached to focusing device 20.

FIG. 8 shows a side view of gear wheel arrangement 22. Gear wheel arrangement 22 comprises first gear wheel 28a and second gear wheel 28b both of which are arranged coaxially. First gear wheel 28a has a larger diameter than second gear wheel 28b. Pin 60, which is positioned at the outer periphery of first gear wheel 28a, is mounted to first gear wheel 28a by nut 70.

FIG. 9 shows a plan view of gear wheel arrangement 22. Second gear wheel 28b is provided at the side of first gear wheel 28a which carries nut 70 for mounting pin 60. Second gear wheel 28b has approximately the length of the width of gear rack 42.

To conclude, it should more particularly be emphasized that the exemplary embodiments selected purely arbitrarily above are merely used to describe the teaching according to the invention, but do not restrict it to these exemplary embodiments.

What is claimed is:

1. A microscope comprising
   a. a microscope stand;
   b. a focusing device arranged inside the microscope stand
   c. at least one operating element at a first end and a second end of the focusing device, each of which protrudes through a side wall of the microscope stand;
   d. a microscope stage moveably mounted to the microscope stand;
   e. at least one objective which defines in its working position an optical axis, and said at least one operating element of the focusing device effects a relative movement between the microscope stage and the objective;
   f. an elongated slot provided at each side wall of the microscope stand which allows a change of the position of said at least one operating element in a horizontal and vertical direction; and
   g. an adjustable stop mechanism to limit the relative movement of the microscope stage in the direction of the optical axis.

2. The microscope as defined in claim 1, wherein the focusing device is provided with a pivot axis around which the focusing device and consequently said at least one operating element is pivotable so that the position of the operating element is adjustable with respect to a side wall of the microscope stand.

3. The microscope as defined in claim 1, wherein the focusing device has a first axle defining the first end and the second end on both of which at least one operating element is mounted and a second axle, which is parallel to the first axle.

4. The microscope as defined in claim 3, wherein the first axle carries a first gear wheel, the second axle carries a gear wheel arrangement and a rocker, and the rotational movement of the first axle is transferred by the first gear wheel to the gear wheel arrangement on the second axle.

5. The microscope as defined in claim 4, wherein the gear wheel arrangement comprises a first gear wheel and a second gear wheel arranged coaxially and the first gear wheel has a larger diameter than the second gear wheel.

6. The microscope as defined in claim 5, wherein the rotational movement of the second gear wheel of the gear wheel arrangement is transferred to a gear rack which moves the microscope stage in the direction of the optical axis of an objective.

7. The microscope as defined in claim 5, wherein the rocker is provided on the second axle which is operated by a pin which is mounted at the periphery of the first gear wheel of the gear wheel arrangement.

8. The microscope as defined in claim 4, wherein the rocker is a one piece element which comprises a first arm and a second arm and the second axle is common for both arms.

9. The microscope as defined in claim 8, wherein the first arm of the rocker is a massive block with a rectangular cross section.

10. The microscope as defined in claim 9, wherein the adjustable stop mechanism comprises a rod, a spring for biasing the rod and a screw for adjusting and fixing a position of the rod and wherein the first arm of rocker engages with a surface of the rod and thereby limits the relative movement of the stage in the direction of the optical axis.

11. The microscope as defined in claim 8, wherein the second arm of rocker defines a free end which has on opposing sides an S-shaped contour which cooperates with a pin mounted at the periphery of a first gear wheel of the gear wheel arrangement.

12. The microscope as defined in claim 1, wherein the adjustable stop mechanism comprises a rod, a spring for biasing the rod and a screw for adjusting and fixing a position of the rod.

13. The microscope as defined in claim 12, wherein a dividing wall element is formed inside the microscope stand and the dividing wall element provides a guide for the screw, the spring and the rod.

14. A focusing device for a microscope comprising:
   a. at least one operating element attached to a first axle of the focusing device for effecting movement of a microscope stage along an optical axis of the microscope; and,
   b. an adjustable stop mechanism cooperating with the focusing device to limit the movement of the microscope stage in the direction of the optical axis;
   wherein a gear wheel is formed on the first axle of the focusing device and a gear wheel arrangement is provided on a second axle; and,
   wherein a rocker is provided on the second axle and is operable by a pin which is mounted at the periphery of a first gear wheel of the gear wheel arrangement.

15. The focusing device as defined in claim 14, wherein the adjustable stop mechanism comprises a rod, a spring for biasing the rod and a screw for adjusting and fixing a position of the rod.

16. The focusing device as defined in claim 15 wherein the adjustable stop mechanism is arranged inside a microscope stand, a dividing wall element is formed inside said microscope stand and the dividing wall element provides a guide for the screw, the spring and the rod.

17. The focusing device as defined in claim 14 wherein the rocker is arranged rotatable on the second axle of the focusing device.

18. The focusing device as defined in claim 14 wherein the adjustable stop mechanism comprises a rod, a spring for biasing the rod and a screw for adjusting and fixing a position of the rod and wherein the rocker has a first arm and a second arm and the second arm cooperates with a pin and the first arm cooperates with the rod of the adjustable stop mechanism.

19. The focusing device as defined in claim 18 wherein the first arm of the rocker is a massive block with a rectangular cross section.

20. The focusing device as defined in claim 19 wherein the first arm of the rocker engages with a surface of the rod and thereby limits the relative movement.

21. The focusing device as defined in claim 18 wherein the second arm of the rocker defines a free end which has on opposing sides an S-shaped contour which cooperates with the pin mounted at the periphery of the first gear wheel of the gear wheel arrangement.

22. The focusing device as defined in claim 14, wherein the gear wheel arrangement comprises a first gear wheel with a larger diameter than a second gear wheel wherein the rotation of the gear wheel is transferred to the first gear wheel of the gear wheel arrangement and the second gear wheel of the gear wheel arrangement transfers its rotational movement to a gear rack which moves the microscope stage in the direction of the optical axis.

* * * * *